(12) United States Patent
Mahajan et al.

(10) Patent No.: US 10,539,250 B2
(45) Date of Patent: Jan. 21, 2020

(54) HIGH VIBRATION, HIGH CYCLE, PULSE WIDTH MODULATED SOLENOID

(71) Applicant: HONEYWELL INTERNATIONAL INC., Morris Plains, NJ (US)

(72) Inventors: Deepak Pitambar Mahajan, Karnataka (IN); Joseph Mintzer, III, Phoenix, AZ (US); Govind Yadav, Karnataka (IN); Renukaprasad N, Karnataka (IN); Varun Anand, Karnataka (IN); Kevin A. K. Jones, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/960,743

(22) Filed: Apr. 24, 2018

(65) Prior Publication Data

US 2019/0323623 A1 Oct. 24, 2019

(51) Int. Cl.
*F16K 31/06* (2006.01)
*F16K 1/34* (2006.01)
*F16K 1/50* (2006.01)

(52) U.S. Cl.
CPC ............ *F16K 31/0655* (2013.01); *F16K 1/34* (2013.01); *F16K 1/50* (2013.01); *F16K 31/0648* (2013.01)

(58) Field of Classification Search
CPC .... F16K 31/0655; F16K 31/0648; F16K 1/50; F16K 1/34; F16K 31/0658; F16K 31/0644
USPC ........................................ 251/129.15–129.22
See application file for complete search history.

(56) References Cited

U.S. PATENT DOCUMENTS

| | | | | |
|---|---|---|---|---|
| 2,820,604 A | * | 1/1958 | Ray | F16K 31/02 251/129.16 |
| 3,263,959 A | | 8/1966 | Wisniewski | |
| 3,632,081 A | | 1/1972 | Evans | |
| 3,799,203 A | | 3/1974 | Doutt | |
| 5,464,191 A | * | 11/1995 | Shenk | B64D 11/02 251/129.15 |
| 6,874,706 B2 | | 4/2005 | Hanneke et al. | |

(Continued)

FOREIGN PATENT DOCUMENTS

| | | |
|---|---|---|
| DE | 3836300 A1 | 4/1990 |
| DE | 19640563 A1 | 4/1998 |

(Continued)

*Primary Examiner* — John Bastianelli
(74) *Attorney, Agent, or Firm* — Lorenz & Kopf, LLP

(57) ABSTRACT

A high vibration, high-cycle, pulse width modulated (PWM) solenoid actuated valve assembly includes a valve housing and a solenoid actuator. The solenoid actuator is coupled to the valve housing and includes a solenoid housing, a bobbin assembly, a coil, an armature, a glide structure, an actuation rod, and an anti-rotation guide structure. The glide structure is disposed at least partially within the armature and between the armature and the inner surface of the yoke. The actuation rod is coupled to, and is axially movable with, the armature, it also extends into the valve housing and has a ball valve integrally formed thereon. The anti-rotation guide structure is disposed within the valve housing and surrounds at least a portion of the actuation rod. At least the actuation rod and the anti-rotation guide each have structural features formed thereon that mate with each other and prevent rotation of the actuation rod and the armature.

20 Claims, 22 Drawing Sheets

(56) References Cited

U.S. PATENT DOCUMENTS

| | | |
|---|---|---|
| 8,459,218 B2 | 6/2013 | Keller et al. |
| 8,733,732 B2 | 5/2014 | Boychuk et al. |
| 8,944,405 B2 | 2/2015 | Manther et al. |
| 2004/0026645 A1* | 2/2004 | Hanneke ............... F02M 47/027 251/129.19 |
| 2004/0075071 A1* | 4/2004 | Braun ................. F15B 13/0402 251/129.15 |
| 2008/0308758 A1 | 12/2008 | Fukano et al. |
| 2008/0308760 A1* | 12/2008 | Matsumoto ......... F16K 31/0627 251/129.15 |
| 2009/0313690 A1 | 12/2009 | Bichot et al. |
| 2012/0288389 A1* | 11/2012 | Kuroyanagi ....... F02M 63/0077 417/559 |

FOREIGN PATENT DOCUMENTS

| | | |
|---|---|---|
| DE | 102005051177 A1 | 5/2007 |
| JP | 2007198729 A | 8/2007 |
| JP | 2017219136 A | 12/2017 |

* cited by examiner

HIGH VIBRATION, HIGH CYCLE, PULSE WIDTH MODULATED SOLENOID

TECHNICAL FIELD

The present invention generally relates to solenoids, and more particularly high-vibration capable solenoids, and even more particularly for solenoids and actuated valve assemblies for high vibration environment.

BACKGROUND

Many modern gas turbine engines, especially those used for propulsion, are configured to include relatively long rotors and relatively small turbine tip clearances. This combination of features, upon engine shutdown, can cause what is known as a "bowed rotor event" if the engine is not spooled down slowly.

One solution that has been postulated to alleviate a bowed rotor event is to pulse width modulate the solenoid-actuated starter air valve (SAV) as part of engine startup sequence, to thereby supply air to the air turbine starter at a pressure that is lower than during engine light-off speed. Doing so may require, in some instances, over 27 million cycles of operation of the solenoid actuator for lifetime of a component. Unfortunately, presently known solenoids are not designed to operate against very high vibration, high pressure and with the required number of operational cycles, or for higher than MTBF (mean time before failure) of greater than 60,000 engine hours.

Hence, there is a need for a high cycle, high vibration capable solenoid that will enable single on/off valve actuation or PWM valve modulation while maintaining suitable operational integrity throughout the needed number of operational cycles. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a high vibration, high-cycle, pulse width modulated (PWM) solenoid actuated valve assembly includes a valve housing and a solenoid actuator. The solenoid actuator is coupled to the valve housing and includes a solenoid housing, a bobbin assembly, a coil, an armature, a glide structure, an actuation rod, and an anti-rotation guide structure. The solenoid housing is coupled to the valve housing. The bobbin assembly is disposed at least partially within the solenoid housing and includes a return pole and a yoke. The yoke has an inner surface that defines an armature cavity. The coil is disposed within the solenoid housing and is wound around at least a portion of the bobbin assembly. The armature is disposed within the armature cavity and is axially movable relative to the yoke. The glide structure is disposed at least partially within the armature cavity and between the armature and the inner surface of the yoke. The actuation rod is coupled to, and is axially movable with, the armature, it also extends into the valve housing and has a ball valve integrally formed thereon. The anti-rotation guide structure is disposed within the valve housing and surrounds at least a portion of the actuation rod. At least the actuation rod and the anti-rotation guide each have structural features formed thereon that mate with each other and thereby prevent rotation of the actuation rod and the armature.

Furthermore, other desirable features and characteristics of the high vibration, high-cycle, pulse width modulated (PWM) solenoid actuated valve assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
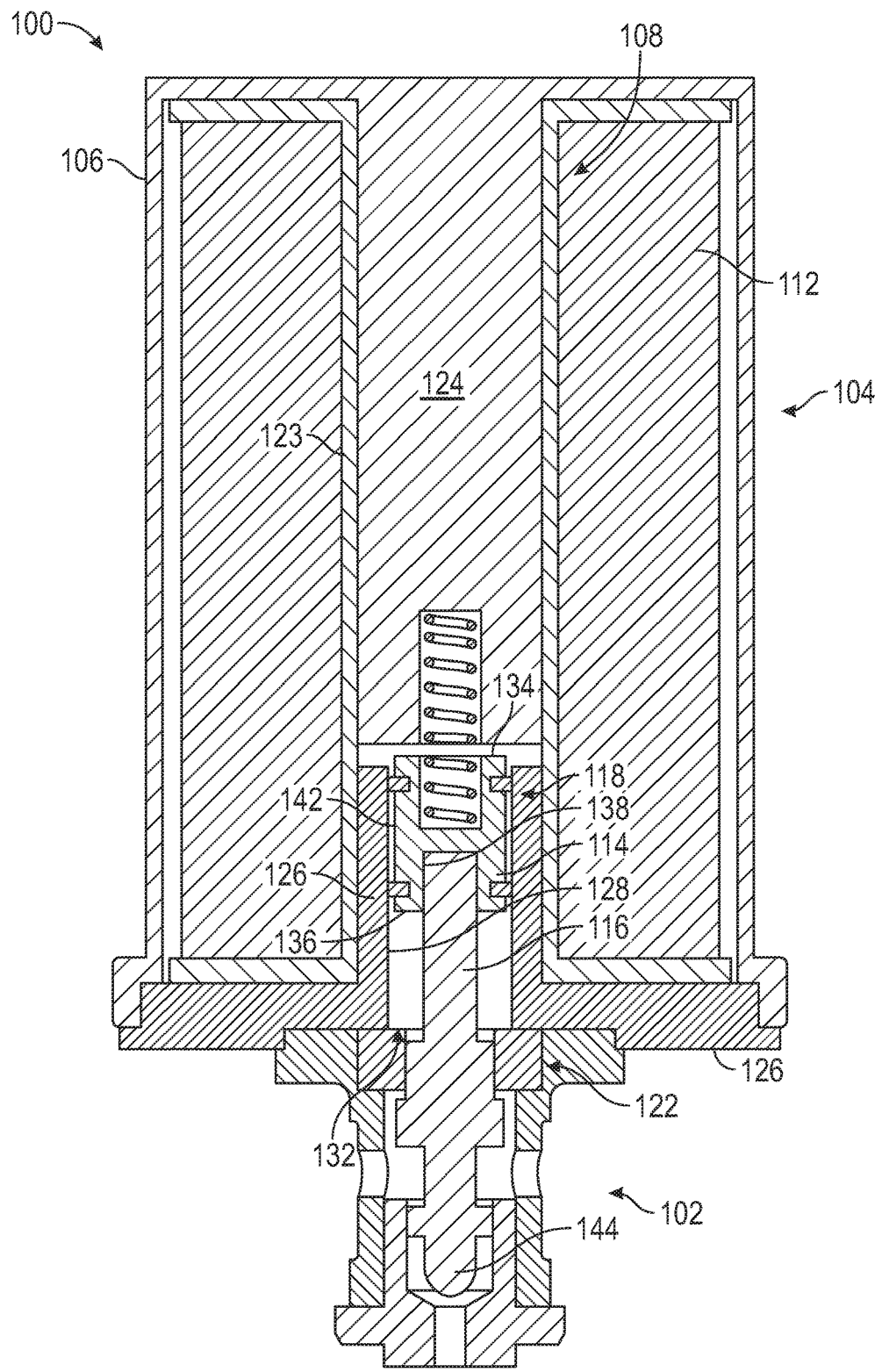
FIG. 1 depicts a cross section view of one embodiment of a high vibration, high-cycle, pulse width modulated (PWM) solenoid actuated valve assembly.

Referring now to FIG. 1, a cross section view of one example embodiment of a high vibration, high-cycle, pulse width modulated (PWM) solenoid actuated valve assembly 100 is depicted. The assembly 100 includes a valve housing 102 and a solenoid actuator 104. The solenoid actuator 104 is coupled to the valve housing 102 and includes a solenoid housing 106, a bobbin assembly 108, a coil 112, an armature 114, an actuation rod 116, a glide structure 118, and an anti-rotation guide structure 122. The solenoid housing 106 is coupled to the valve housing 102 and has at least the bobbin assembly 108, coil 112, armature 114, and glide structure 118 disposed therein.

The solenoid housing 106 may comprise any one of numerous materials having a relatively high magnetic permeability such as, for example, magnetic steel. The solenoid housing 106, in addition to having a plurality of components disposed therein, provides a flux path, together with the bobbin assembly 108, for magnetic flux that the coil 112 generates when it is electrically energized.

The bobbin assembly 108, as just noted, is disposed at least partially within the solenoid housing 106, an includes at least a bobbin 123, a return pole 124, and a yoke 126. The return pole 124 is fixedly coupled to, and extends into, the solenoid housing 106. The return pole 124 preferably comprises a material having a relatively high magnetic permeability. The return pole 124, together with the solenoid housing 106, the armature 114, and the yoke 126 provides a magnetic flux path for the magnetic flux that is generated by the coil 112 when it is energized.

The coil 112 is disposed within the solenoid housing 106 and is adapted to be electrically energized from a non-illustrated electrical power source. As just noted, when it is energized, the coil 112 generates magnetic flux. In the depicted embodiment, the coil 112 is wound around at least a portion of the bobbin 123, and comprises a relatively fine gauge magnet wire, though larger gauge magnet wire could also be used. The magnet wire may be fabricated from any one of numerous conductive materials including, but not limited to, copper, aluminum, nickel, and silver. Although only a single coil 112 is depicted in FIG. 1, it will be appreciated that the solenoid actuator 104 could be configured with two or more coils, if needed or desired.

The armature 114 is disposed (at least partially) within the yoke 126. More specifically, the yoke 126 has an inner surface 128 that defines an armature cavity 132. The armature 114 is disposed (at least partially) within the armature cavity 132, and is axially movable relative to the yoke 126. The depicted armature 114 includes an armature first end 134, an armature second end 136, an armature inner surface 138, and an armature outer surface 142. The depicted armature 114 preferably comprises a material having a relatively high magnetic permeability and, as noted previously, together with the solenoid housing 106, the return pole 124, and the yoke 126, provides a magnetic flux path for the magnetic flux that is generated by the coil 112 when it is energized.

The actuation rod 116 is coupled to, and is axially movable with, the armature 114. In the depicted embodiment, the actuation rod 116 extends into the armature cavity 132 and into the valve housing 102. Moreover, at least in the depicted embodiment, the actuation rod 116 has a valve element 144 integrally formed thereon. In the depicted embodiment, the valve element 144 is configured as a ball valve. It will be appreciated, however, that other valve element configurations could be used, if needed or desired.

The glide structure 118 is disposed at least partially within the armature cavity 132 between the armature 114 and the inner surface 128 of the yoke 126, and the anti-rotation guide structure 122 is disposed within the valve housing 102 and surrounds at least a portion of the actuation rod 116. The glide structure 118 and the anti-rotation guide structure 122 both are preferably comprised at least partially of a thermoplastic polymer material. Although various thermoplastic polymer materials are suitable, and may be used, in one particular embodiment, the thermoplastic polymer material is polyetheretherketone (PEEK). All or portions of the glide structure 118 and anti-rotation guide structure 122 may be comprised entirely of the thermoplastic polymer material, or may be formed of other suitable materials, such as a suitable metal, that are coated (or at least partially coated) with the thermoplastic polymer material, with polytetrafluoroethylene (PTFE), or with fluorinated ethylene propylene (FEP).

The glide structure 118 reduces frictional forces on the armature 114, and reduces the formation of plating/metal debris. Because it comprises non-magnetic materials, the glide structure 118 also functions as an interrupter between the return 124 and the yoke 126. The anti-rotation guide structure 122 and the actuation rod 116 both have structural features formed thereon that mate with each other and thereby prevent rotation of the actuation rod 116 and the armature 114. It will be appreciated that the glide structure 118 and the anti-rotation guide structure 122 may be variously configured to implement the respective functions. Some example configurations will now be described, beginning with various configurations of the glide structure 118.

Figure 2:
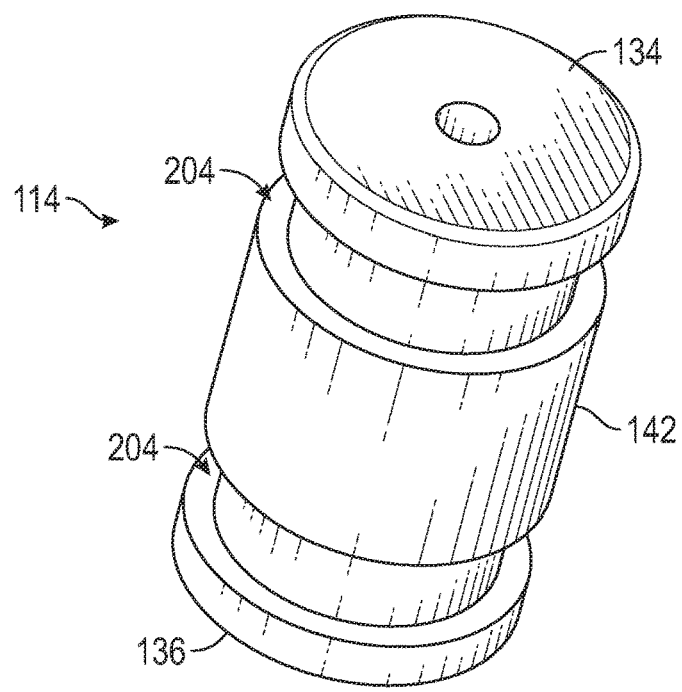
FIGS. 2-4 depict one embodiment of a glide structure that may be implemented in the assembly of FIG. 1.
Figure 3:
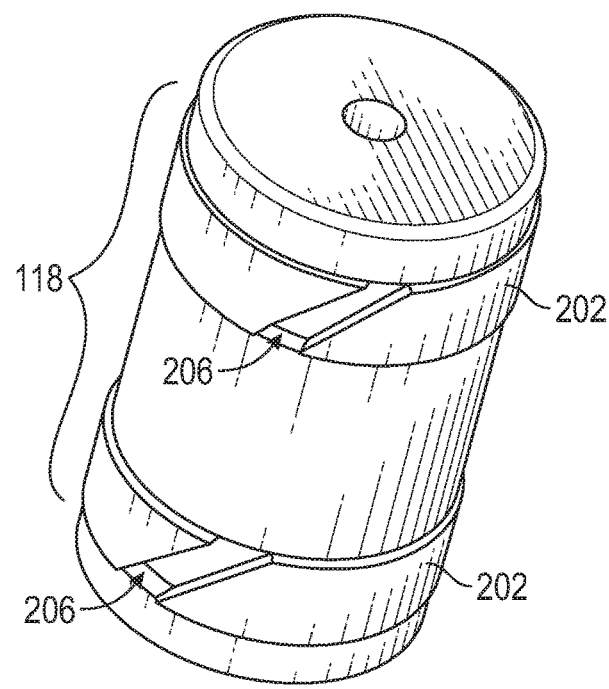
Figure 4:
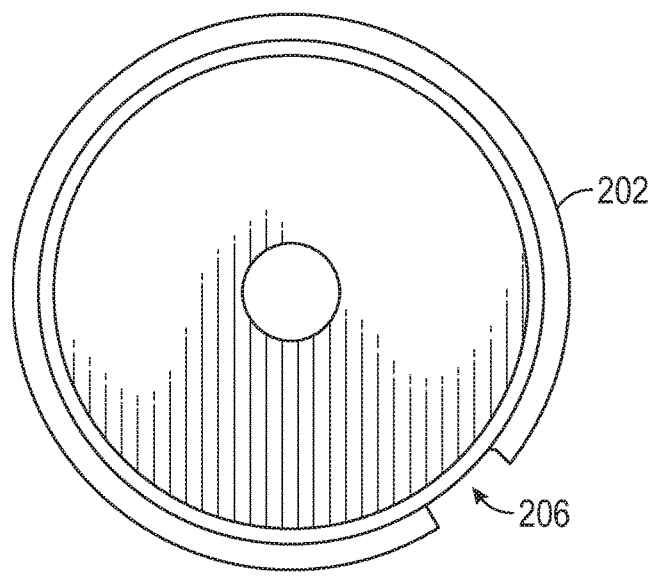

Referring first to FIGS. 2-4, the glide structure 118 depicted therein comprises a plurality of glide rings 202. In this embodiment, the armature outer surface 142 has a plurality of spaced-apart grooves 204 formed circumferentially therein, and each glide ring 202 is disposed at least partially in, and extends radially from, a different one of the grooves 204. Although the depicted armature 114 includes two grooves 204, and thus the glide structure 118 comprises two glide rings 202, it will be appreciated that the armature 114 could be implemented with more or less than this number of grooves 204, and thus the glide structure 118 may be implemented using more or less than this number of glide rings 202.

As FIGS. 3 and 4 further depict, each glide ring 202 may further include a glide ring slit 206. The glide ring slits 206, when included, are configured to allow for thermal expansion. Although the glide ring slits 206 are depicted as being formed at an angle, it will be appreciated that this is merely on example configuration, and may be varied.

Figure 5:
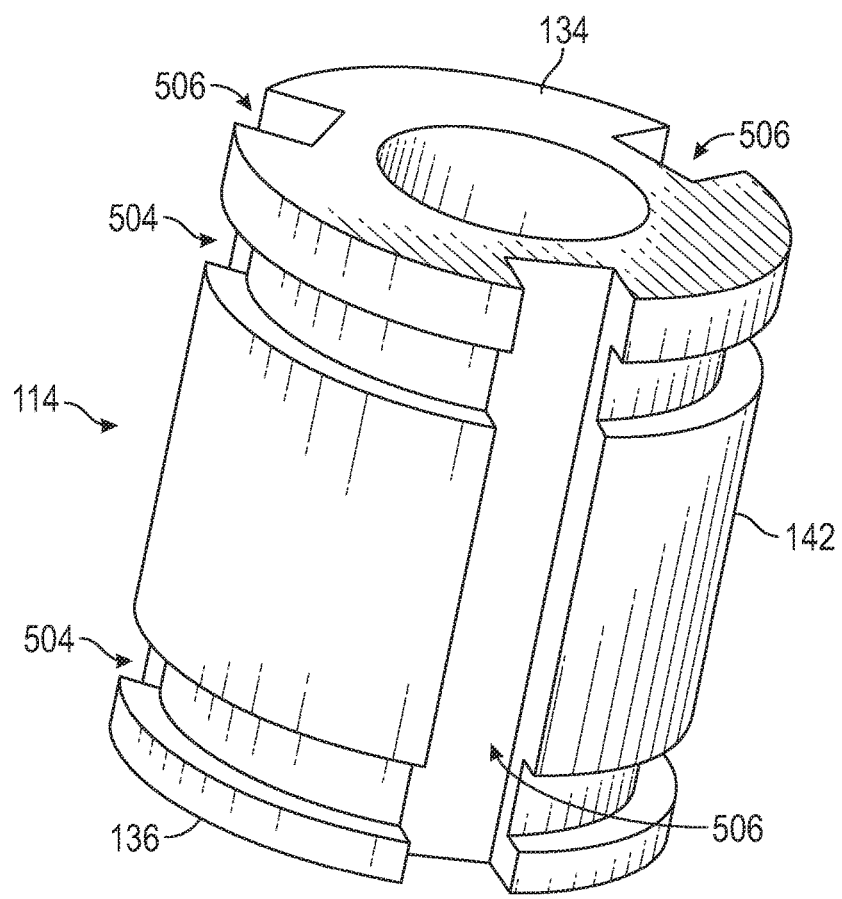
FIGS. 5-7 depict another embodiment of a glide structure that may be implemented in a high vibration, high-cycle, PWM solenoid actuated valve assembly.
Figure 6:
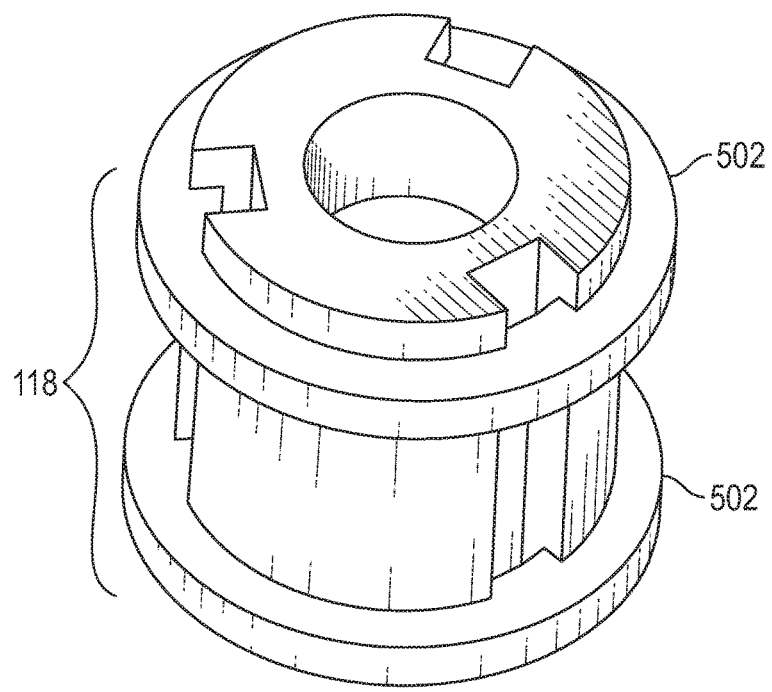
Figure 7:
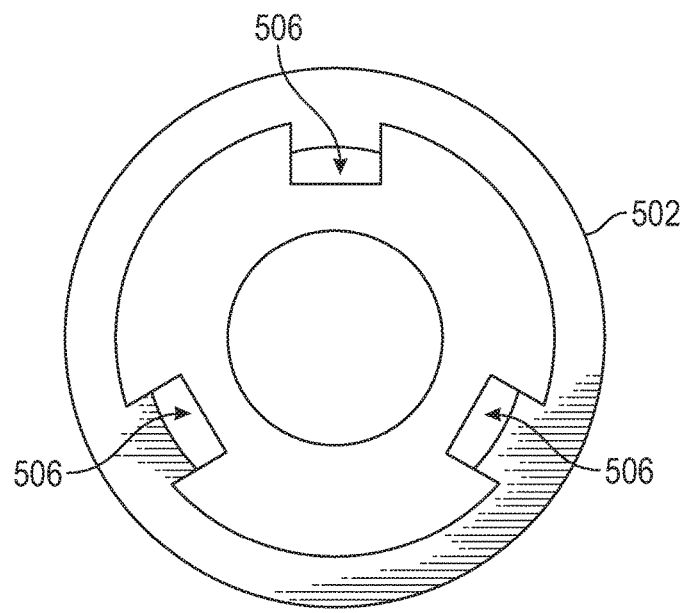

In another embodiment, which is depicted in FIGS. 5-7, the glide structure 118 also comprises a plurality of glide rings 502, and the armature outer surface 142 also has a plurality of spaced-apart grooves 504 formed circumferentially therein. Here too, each glide ring 502 is disposed at least partially in, and extends radially from, a different one of the grooves 504. Although the depicted armature 114 includes two grooves 504, and thus the glide structure 118 comprises two glide rings 502, it will be appreciated that the armature 114 could be implemented with more or less than this number of grooves 504, and thus the glide structure 118 may be implemented using more or less than this number of glide rings 502.

As FIGS. 5-7 further depict, the armature outer surface 142 may, at least in some embodiments, further include a plurality of spaced-apart axial slots 506 that each extend between the armature first end 134 and the armature second end 136. A portion of each glide ring 502 may be disposed partially in a different one of the plurality of spaced-apart axial slots 506. The axial slots 506, when included, are configured to prevent any air pocket blockage from occurring. Although the depicted armature 114 includes three, evenly spaced-apart axial slots 506, it will be appreciated that the armature 114 could be implemented with more or less than this number of axial slots 506.

Regardless of the number of grooves 204, 504, axial slots 506, and glide rings 202, 502, and as FIG. 1 depicts, with this glide structure configuration the glide rings 202, 502 slidably engage the inner surface 128 of the yoke 126.

Figure 8:
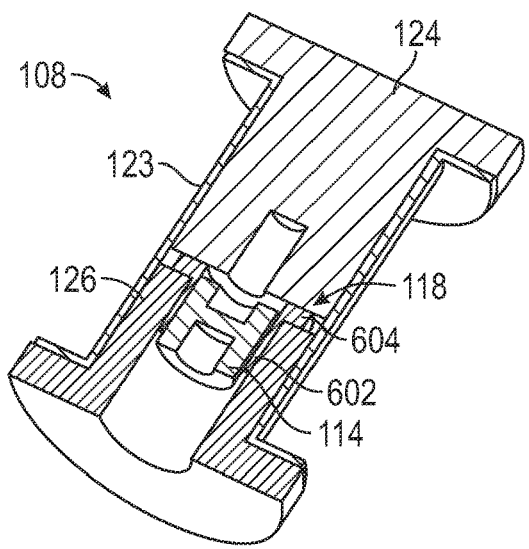
FIGS. 8 and 9 depict another embodiment of a glide structure that may be implemented in a high vibration, high-cycle, PWM solenoid actuated valve assembly.
Figure 9:
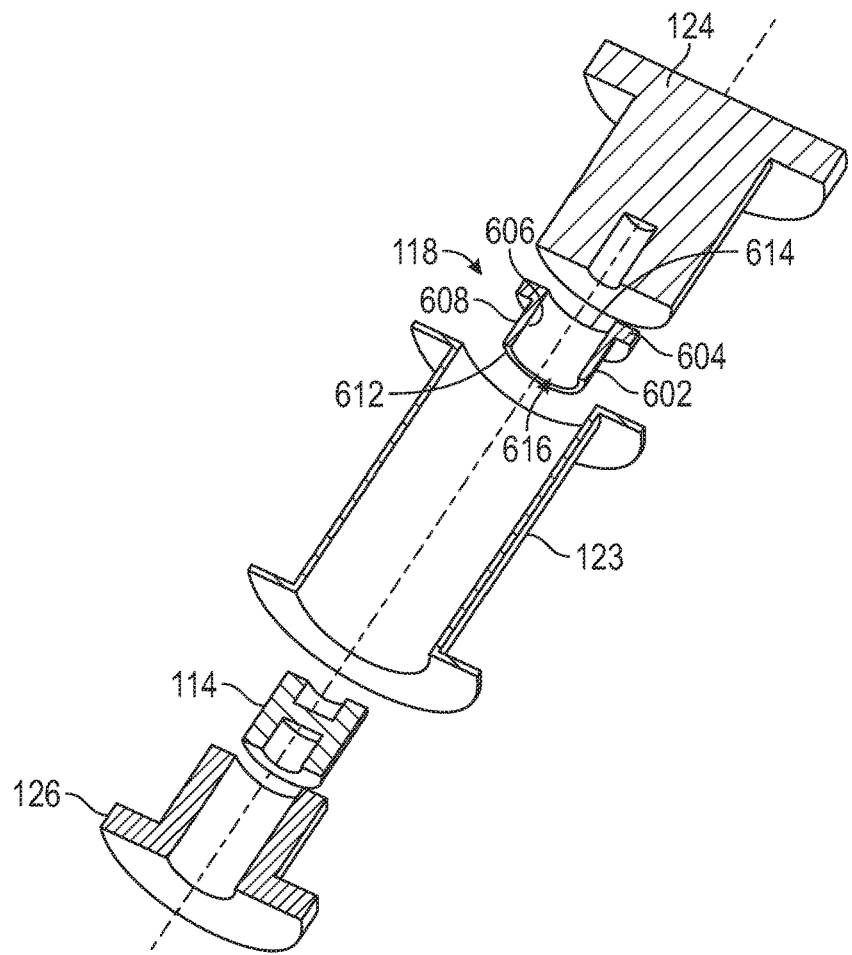
Figure 10:
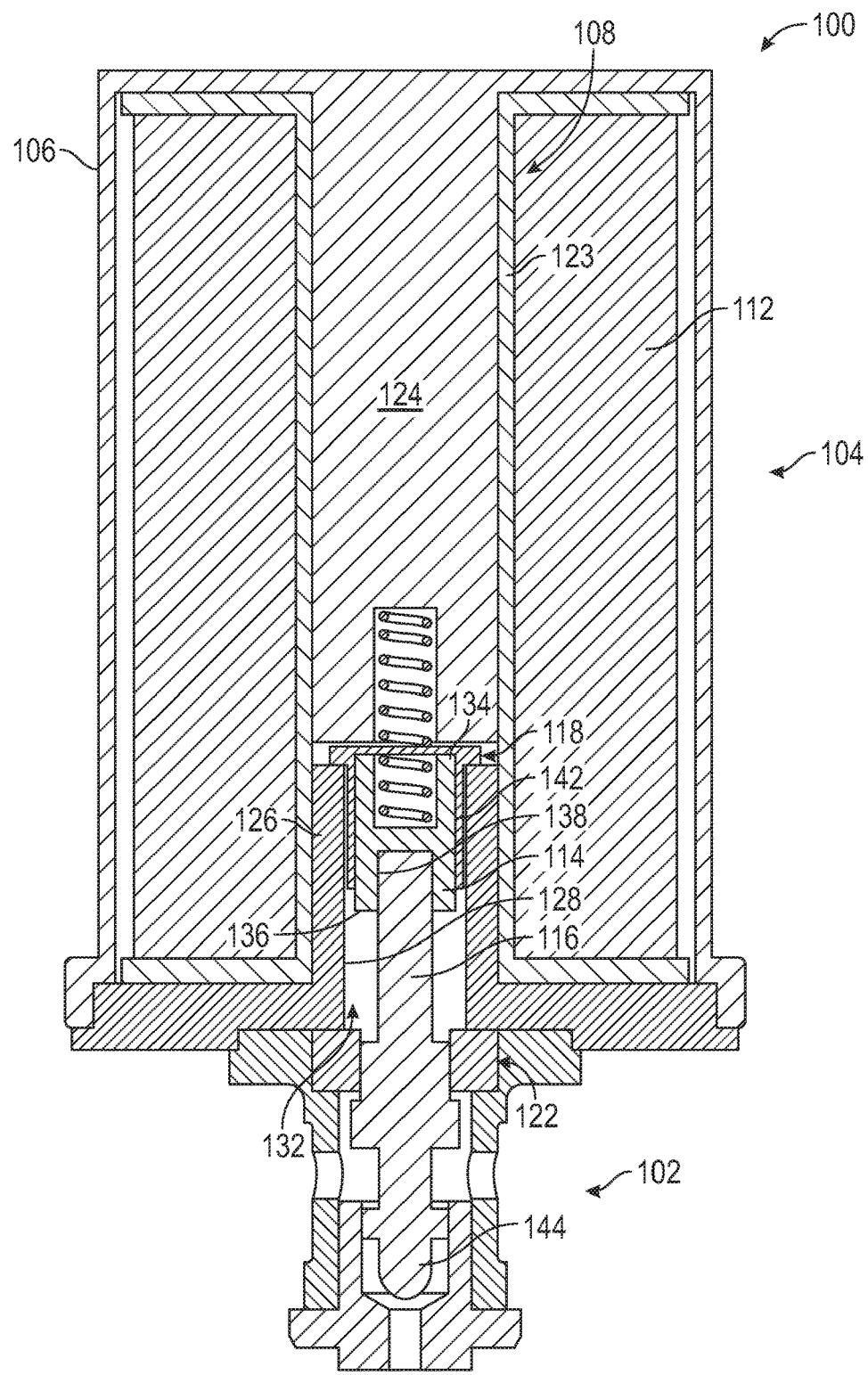
FIG. 10 depicts a cross section view of one embodiment of a high vibration, high-cycle, PWM solenoid actuated valve assembly with the glide structure of FIGS. 8 and 9 implemented therein.
Figure 11:
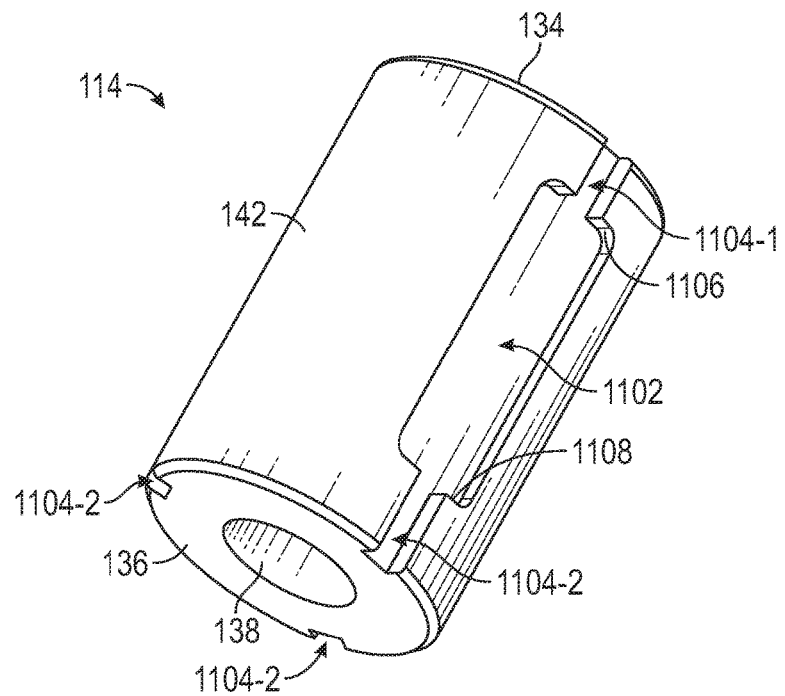
FIGS. 11-14 depict another embodiment of a glide structure that may be implemented in a high vibration, high-cycle, PWM solenoid actuated valve assembly.

Referring now to FIGS. 8-10, the glide structure 118 depicted therein is configured as a cylindrical cap that includes a cylindrical main body 602 and a flange 604. The cylindrical main body 602 has a main body inner surface 606, a main body outer surface 608, a main body first end 612, and a main body second end 614. The main body inner surface 606 defines a passageway 616 that extends between the main body first and second ends 612, 614. The armature 114 extends into the passageway 616 and slidably engages the main body inner surface 606. The main body outer surface 608 engages the inner surface 128 of the yoke 126. The flange 204 extends radially from the main body second end 214, and engages an end of the yoke 126.

Figure 12:
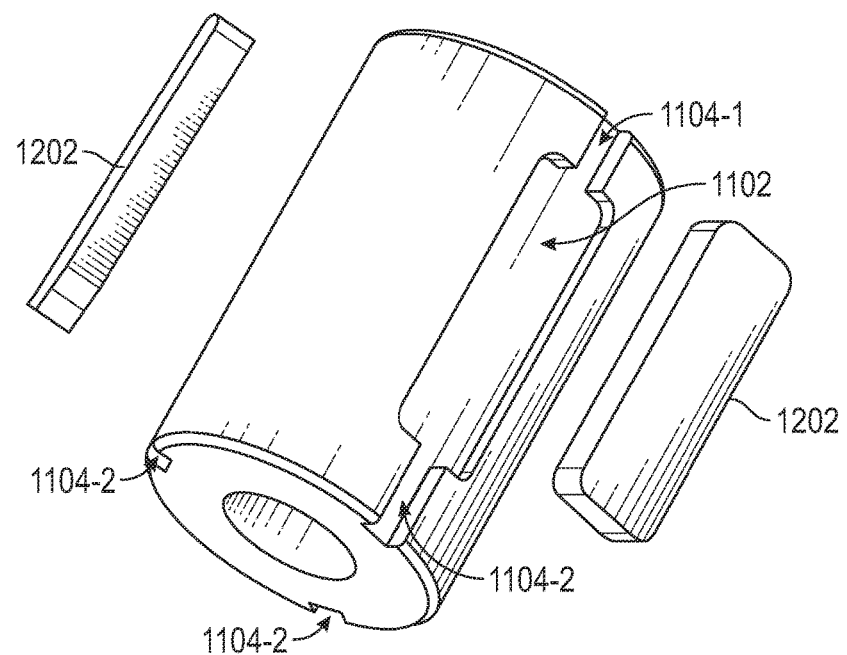
Figure 13:
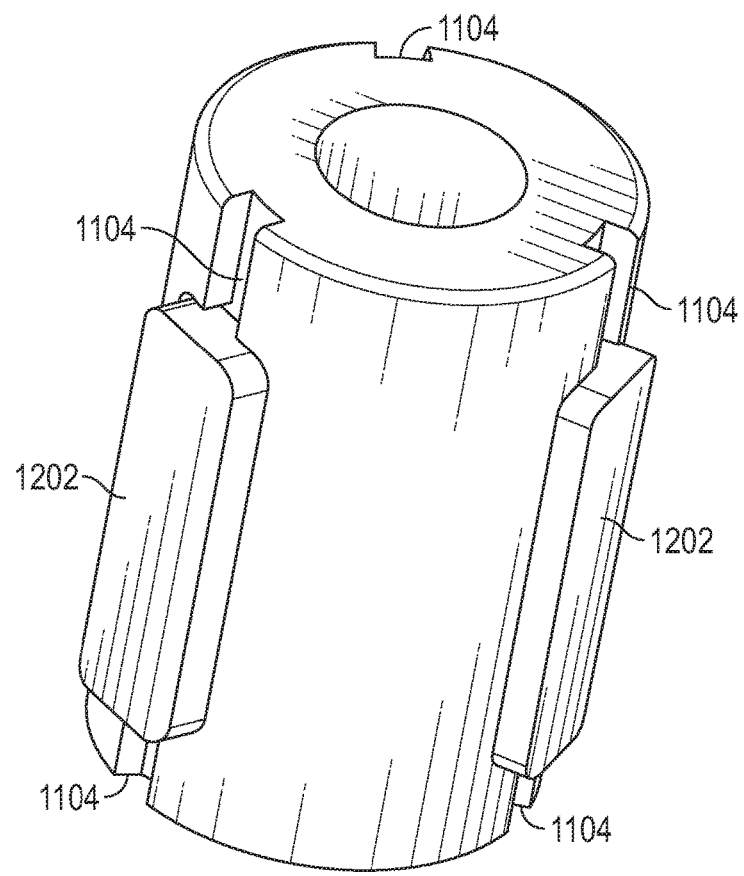
Figure 14:
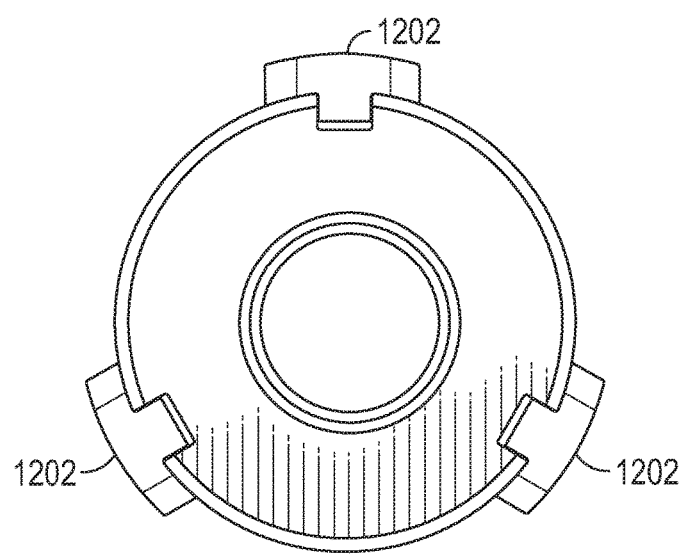

Another embodiment of the glide structure 118 is depicted in FIGS. 11-15. With this embodiment, as shown most clearly in FIGS. 11 and 12, the armature outer surface 142 has a plurality of spaced-apart glide pockets 1102 formed therein (only one visible in FIGS. 11 and 12). Each of the glide pockets 1102 is disposed between the armature first end 134 and the armature second end 136. As FIG. 12 depicts, the glide structure 118 comprises a plurality of glide strips 1202. Each glide strip 1202, as FIGS. 13 and 14 depict, is disposed at least partially in, and extends radially from, a different one of the plurality of glide pockets 1102.

Referring again to FIG. 11, with this embodiment a plurality relief grooves 1104 may also be formed the armature outer surface 138. In particular, a first relief groove 1104-1 extends between the armature first end 134 and a first end 1106 of each glide pocket 1102, and a second relief groove 1104-2 extends between the armature second end 136 and a second end 1108 of each glide pocket 1102. The relief grooves 1104 prevent any air pocket blockage from occurring, and allow for debris to escape.

Figure 15:
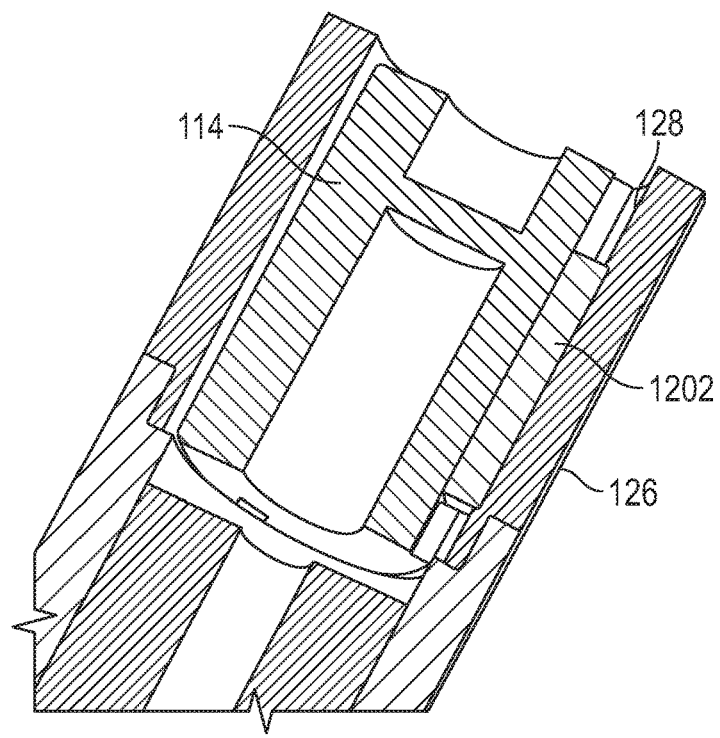
FIG. 15 depicts a cross section view of a portion of a high vibration, high cycle PWM solenoid actuated valve assembly with the glide structure of FIGS. 11-14 implemented therein.
Figure 16:
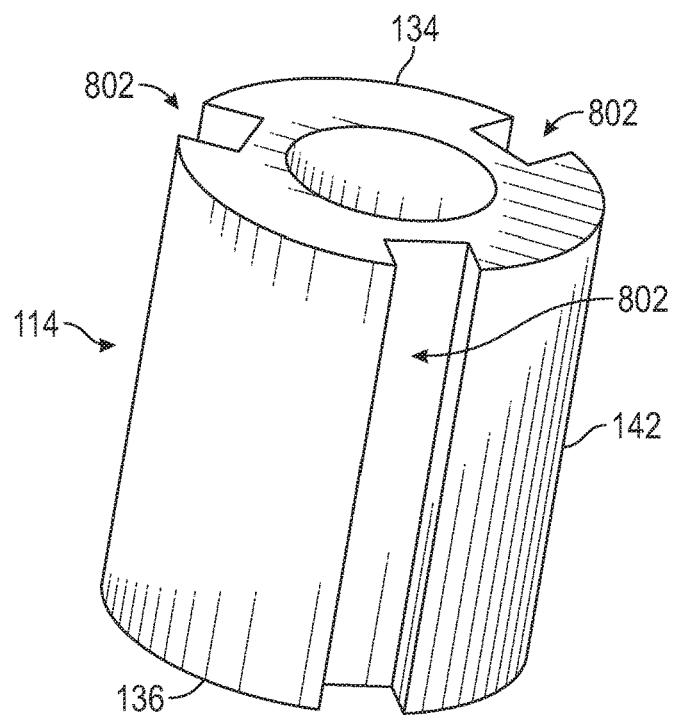
FIGS. 16-19 depict another embodiment of a glide structure that may be implemented in a high vibration, high-cycle, PWM solenoid actuated valve assembly.

The armature 114 depicted in FIGS. 11-14 includes three glide pockets 1102, and thus the glide structure 118 comprises three glide strips 1202. It will be appreciated, however, that the armature 114 could be implemented with more or less than this number of glide pockets 1102, and the glide structure 118 may be implemented using more or less than this number of glide strips 1202. Regardless of the number of glide pockets 1102 and glide strips 1202, and as FIG. 15 depicts, with this glide structure configuration the glide strips 1202 slidably engage the inner surface 128 of the yoke 126.

Figure 17:
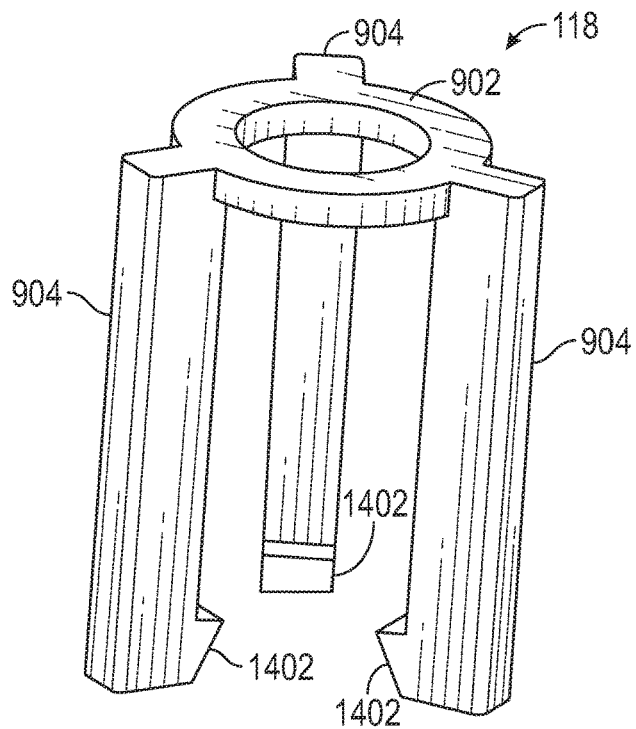
Figure 18:
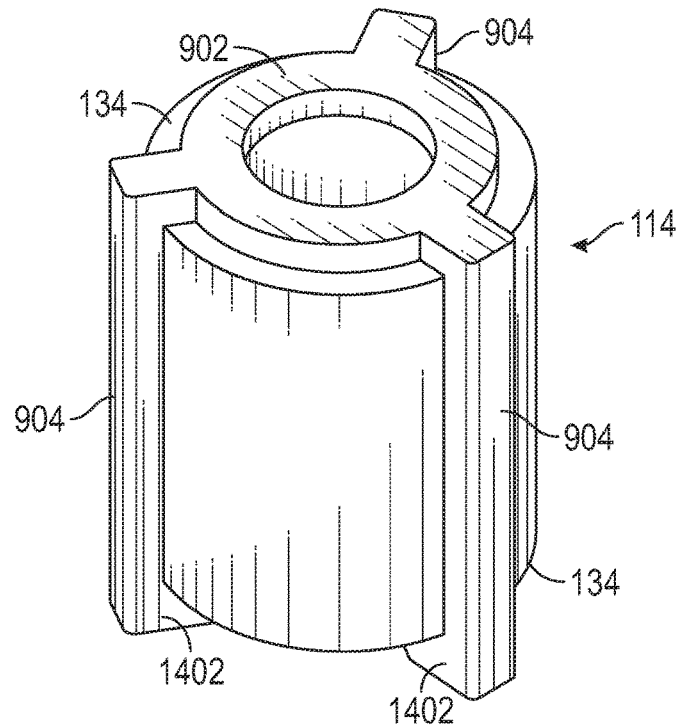
Figure 19:
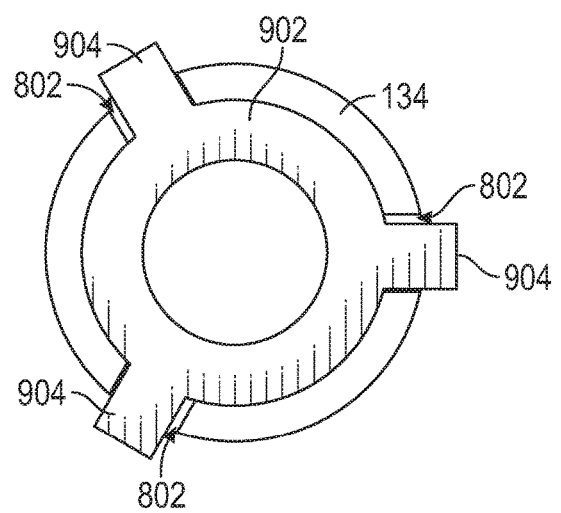

Yet another embodiment of the glide structure 118 is depicted in FIGS. 16-20. The armature 114 in this embodiment also has a plurality of spaced-apart axial slots 802 formed in the armature outer surface 142, and each axial slot 802 extends between the armature first end 134 and the armature second end 136. As FIG. 17 depicts, the glide structure 118 also comprises a glide cap 902 and a plurality of arms 904 that extend from the glide cap 902 to an arm terminus. In this embodiment, however, each arm terminus has a protrusion 1402 formed thereon that extends radially inwardly. As depicted in FIG. 18, when assembled, the glide cap 902 engages the armature first end 134, each of the arms 904 is disposed at least partially in, and extends radially from, a different one of the plurality of axial slots 802, and each protrusion 1402 engages the armature second end 136. As with the previously described embodiment, and as depicted in FIG. 19, the axial slots 802 and the arms 904 are dimensioned such that, when assembled, there is a gap between each arm 904 and at least one side of the associated slot 802 to prevent any air pocket blockage from occurring.

Figure 20:
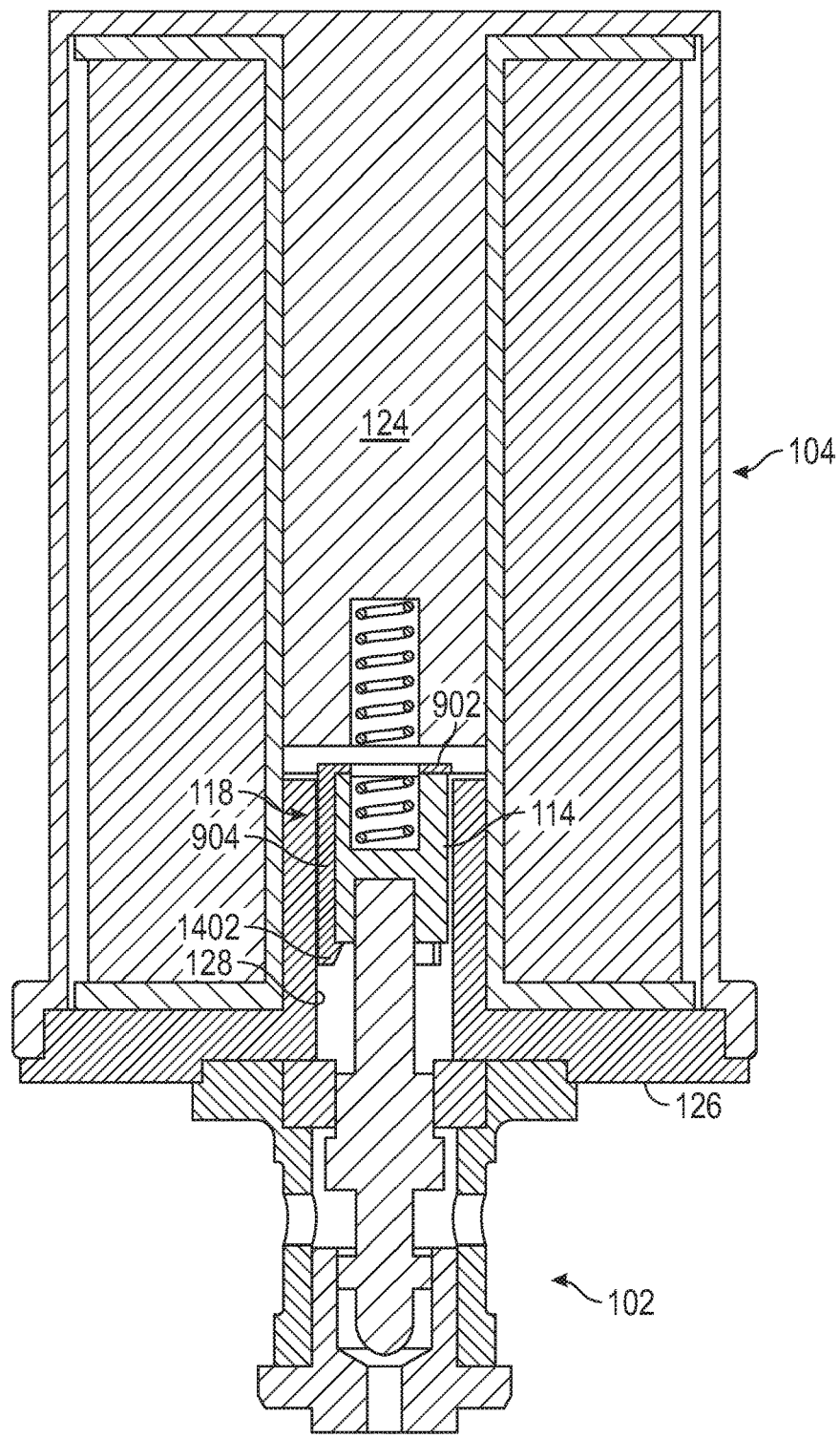
FIG. 20 depicts a cross section view of one embodiment of a high vibration, high-cycle, PWM solenoid actuated valve assembly with the glide structure of FIGS. 16-19 implemented therein.

As with the previous embodiment, the depicted armature 114 includes three axial slots 802, and thus the glide structure 118 comprises three arms 904. It will be appreciated, however, that the armature 114 could be implemented with more or less than this number of axial slots 802, and this the glide structure 118 may be implemented using more or less than this number of arms 904. Regardless, however, and as FIG. 20 depicts, with this glide structure configuration the arms 904 slidably engage the inner surface 128 of the yoke 126.

As was previously noted, the anti-rotation guide structure 122 may also be variously configured to implement its respective functions. Some non-limiting example configurations will be described momentarily. Before doing so, however, it is noted that the valve housing 102 associated each configuration includes some common features. Thus, a description of at least some of these common features of the valve housing 102 to each embodiment will first be described. In doing so, it is noted that the depicted valve housing 102 is configured for a two-way valve. It will be appreciated, however, that the common features could readily be implemented in a valve housing 102 that is configured for a three-way valve.

Figure 21:
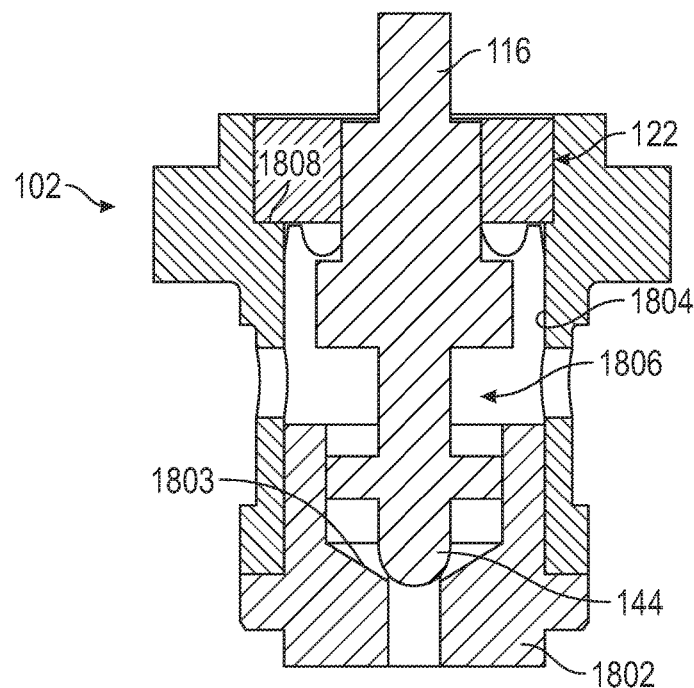
FIG. 21 depicts a cross section view of a valve housing that may comprise any one of the high vibration, high-cycle, PWM solenoid actuated valve assemblies, and which includes various component disposed therein.
Figure 22:
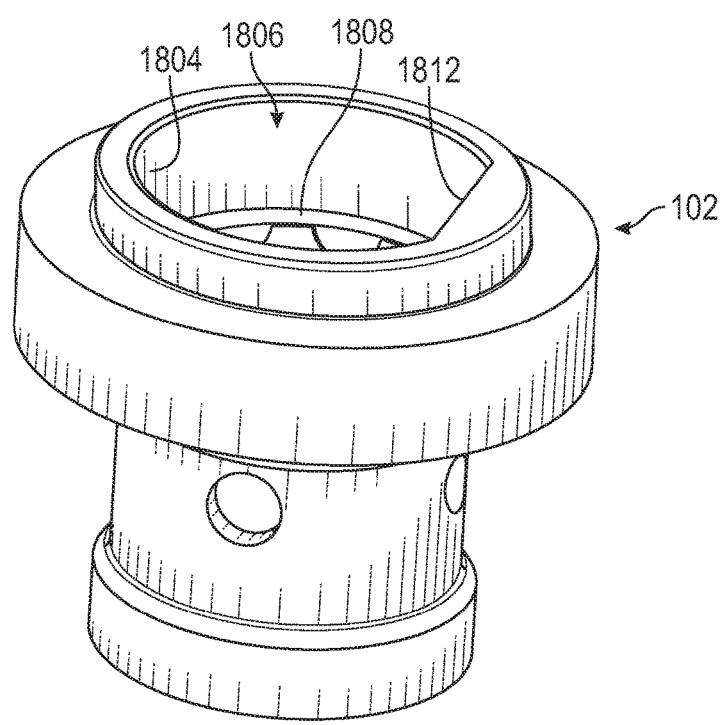
FIG. 22 depicts a plan view of the valve housing depicted in FIG. 21.

With reference first to FIG. 21, a cross section view of an example valve housing 102, with the actuation rod 116 and integrally formed valve element 144, the anti-rotation guide structure 122, and a valve seat structure 1802 disposed therein, is depicted. The valve seat structure 1802 defines a valve seat 1803 that is selectively engaged by the valve element 144 that is integrally formed on the actuation rod 116. The valve housing 102 includes a housing inner surface 1804 that defines an actuation rod cavity 1806. The housing inner surface 1804 has a stopper seat 1808 formed therein. As FIG. 22 depicts, the housing inner surface 1804 also includes a flat outer stopper mating surface 1812.

Figure 23:
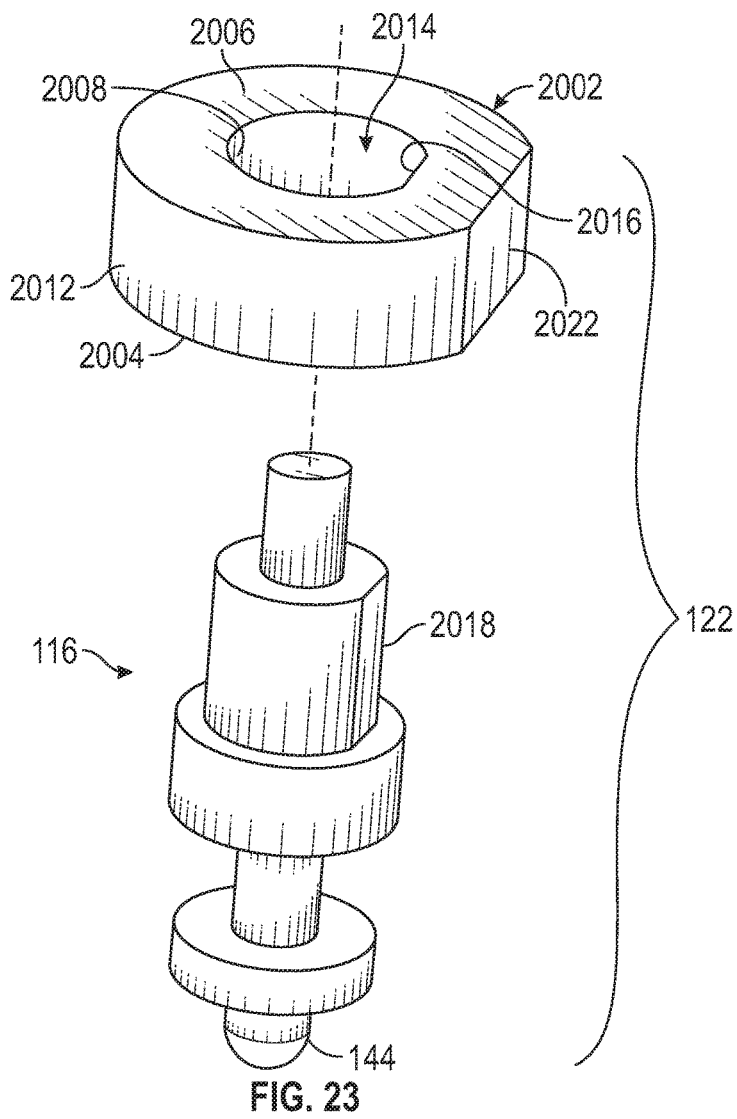
FIGS. 23-30 depict various embodiments of an anti-rotation guide structure that may be implemented in a high vibration, high-cycle, PWM solenoid actuated valve assembly.
Figure 24:
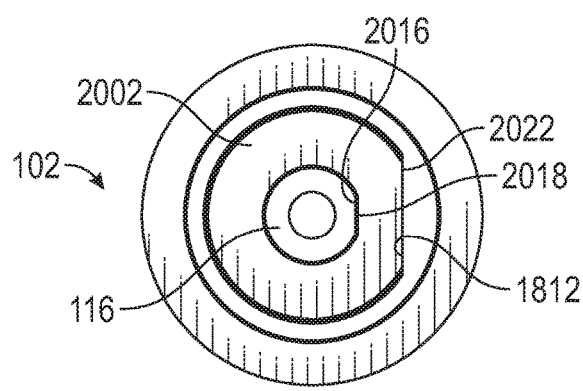

Turning now to FIGS. 23 and 24, in one embodiment the anti-rotation guide structure 122 includes a stopper 2002 that has a stopper first end 2004, a stopper second end 2006, a stopper inner surface 2008, and a stopper outer surface 2012. The stopper first end 2004 engages the stopper seat 1808 that is formed in the valve housing 102. The stopper inner surface 2008 defines an actuation rod opening 2014 and has a flat actuation rod mating surface 2016 formed thereon that mates with a flat inner stopper mating surface 2018 that is formed on the actuation rod 116. The stopper outer surface 2012 has a flat valve housing mating surface 2022 formed thereon that mates with the flat outer stopper mating surface 1812 on the housing inner surface.

Figure 25:
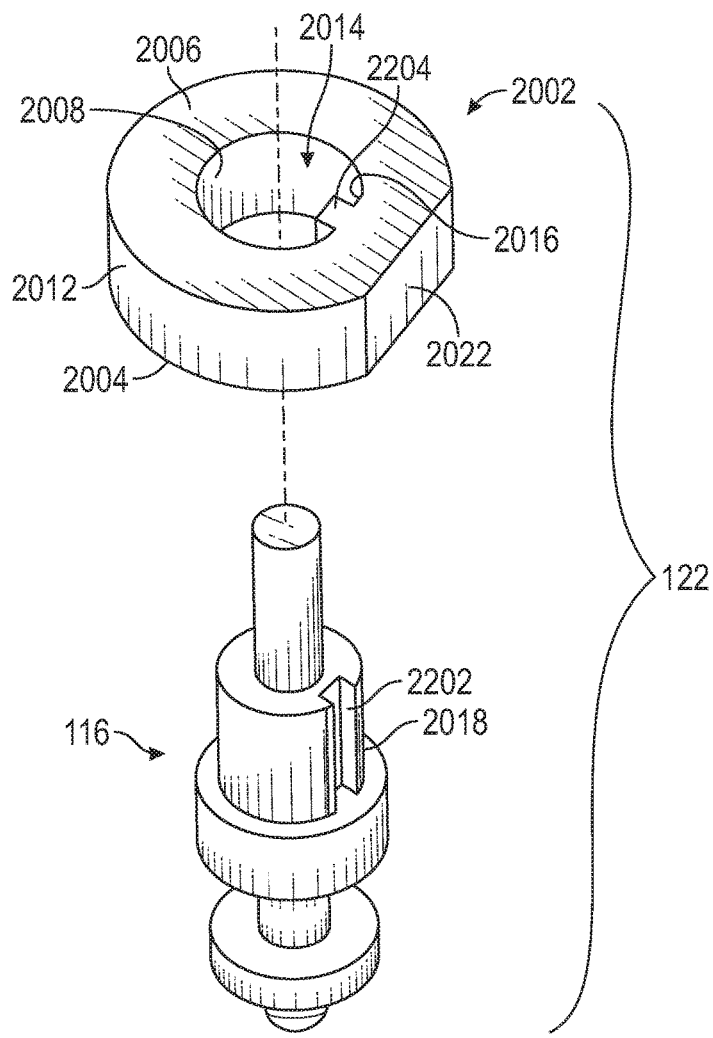
Figure 26:
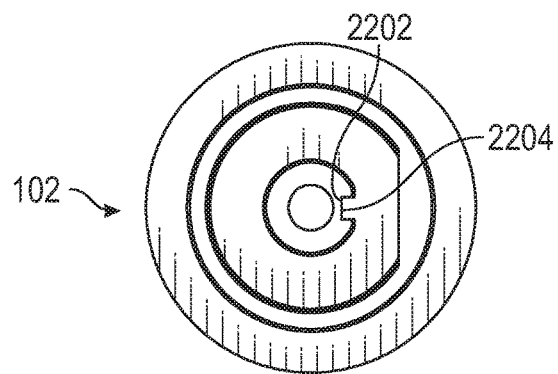

In another embodiment, which is depicted in FIGS. 25 and 26, stopper 2002 and actuation rod 116 are configured similar to the embodiment depicted in FIGS. 20 and 21, but each includes additionally features. In particular, the actuation rod 116 has a stopper engagement slot 2202 formed in the flat inner stopper mating surface 2018, and the stopper inner surface 2008 has a slot engagement pin 2204 that extends inwardly from the flat actuation rod mating surface 2016 and is disposed within the stopper engagement slot 2202.

Figure 27:
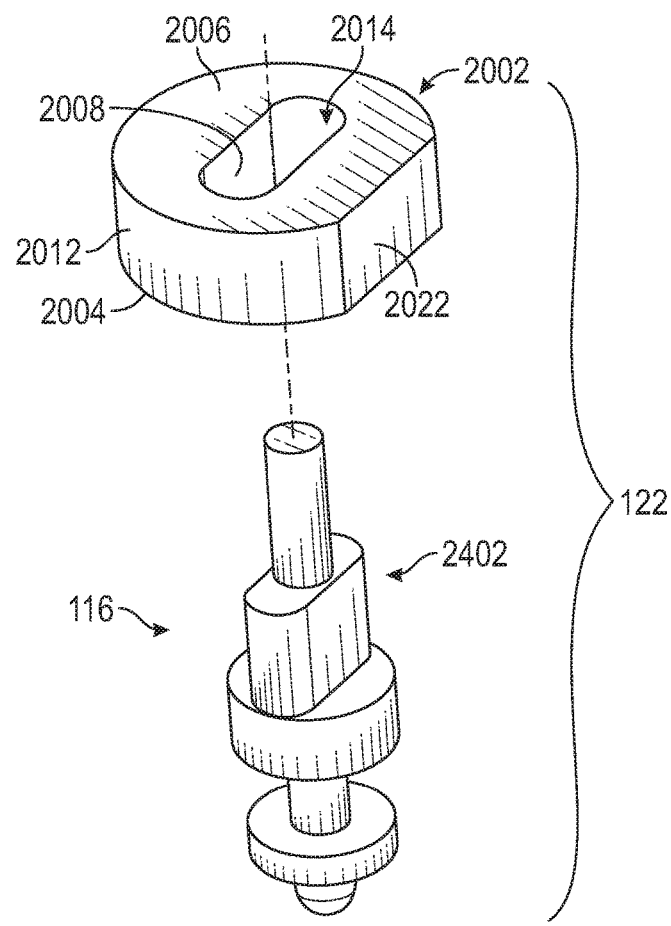
Figure 28:
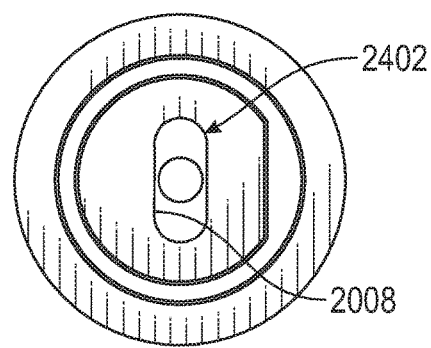

In the embodiment depicted in FIGS. 27 and 28, the actuation rod opening 2014 has an elliptical cross section. In addition, a portion 2402 of the actuation rod 116 has an elliptical cross section. The portion 2402 of the actuation rod 116 having the elliptical cross section is disposed in and mates with the elliptically shaped actuation rod opening 2014.

Figure 29:
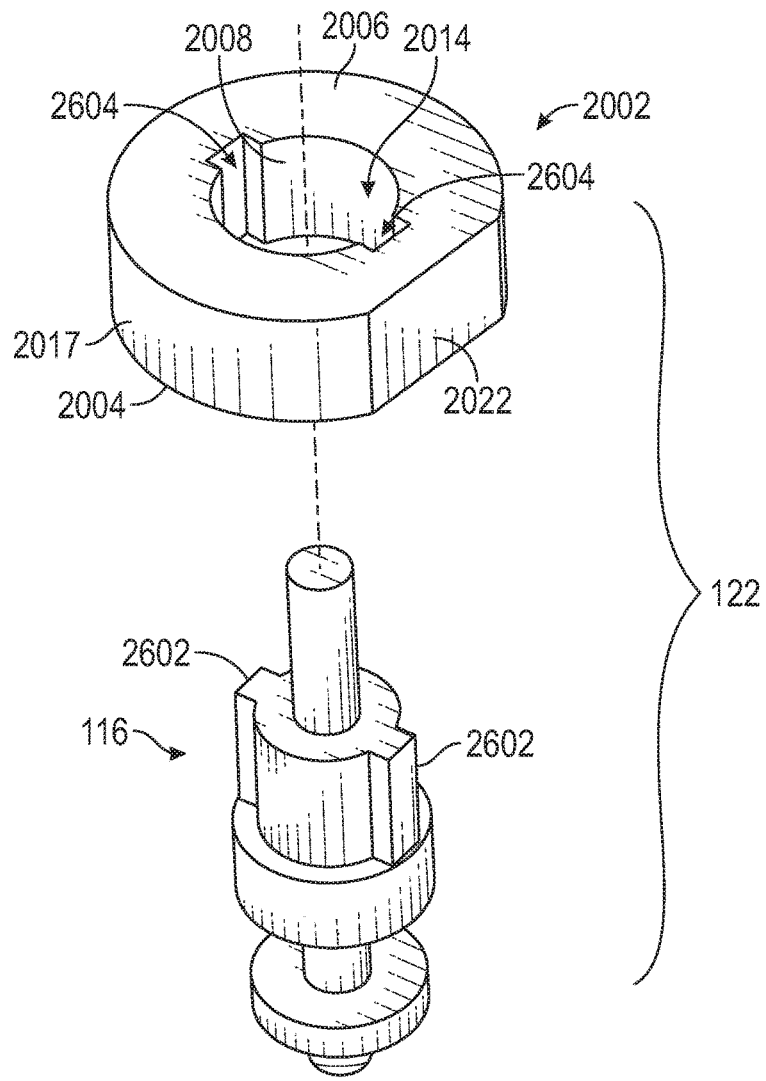
Figure 30:
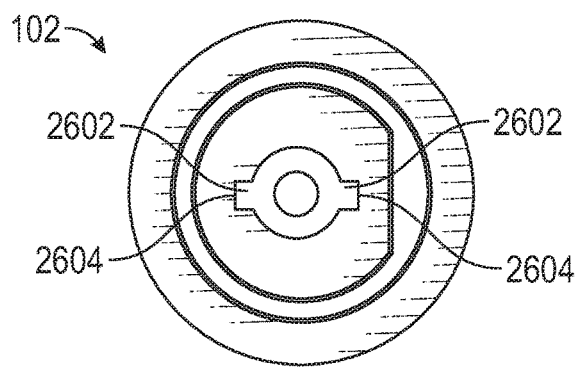

In the embodiment depicted in FIGS. 29 and 30, the actuation rod 116 has a plurality of spaced-apart slot engagement pins 2602 formed thereon that extend radially outward. The stopper inner surface 2008 has a plurality of spaced-apart actuation rod engagement slots 2604 formed thereon. Each of the slot engagement pins 2602 is disposed in a different of the actuation rod engagement slots 2604. Although two slot engagement pins and two actuation rod engagement slots 2604 are depicted, it will be appreciated that the actuation rod 116 and stopper 2002 could include more or less than this number, if needed or desired.

Figure 31:
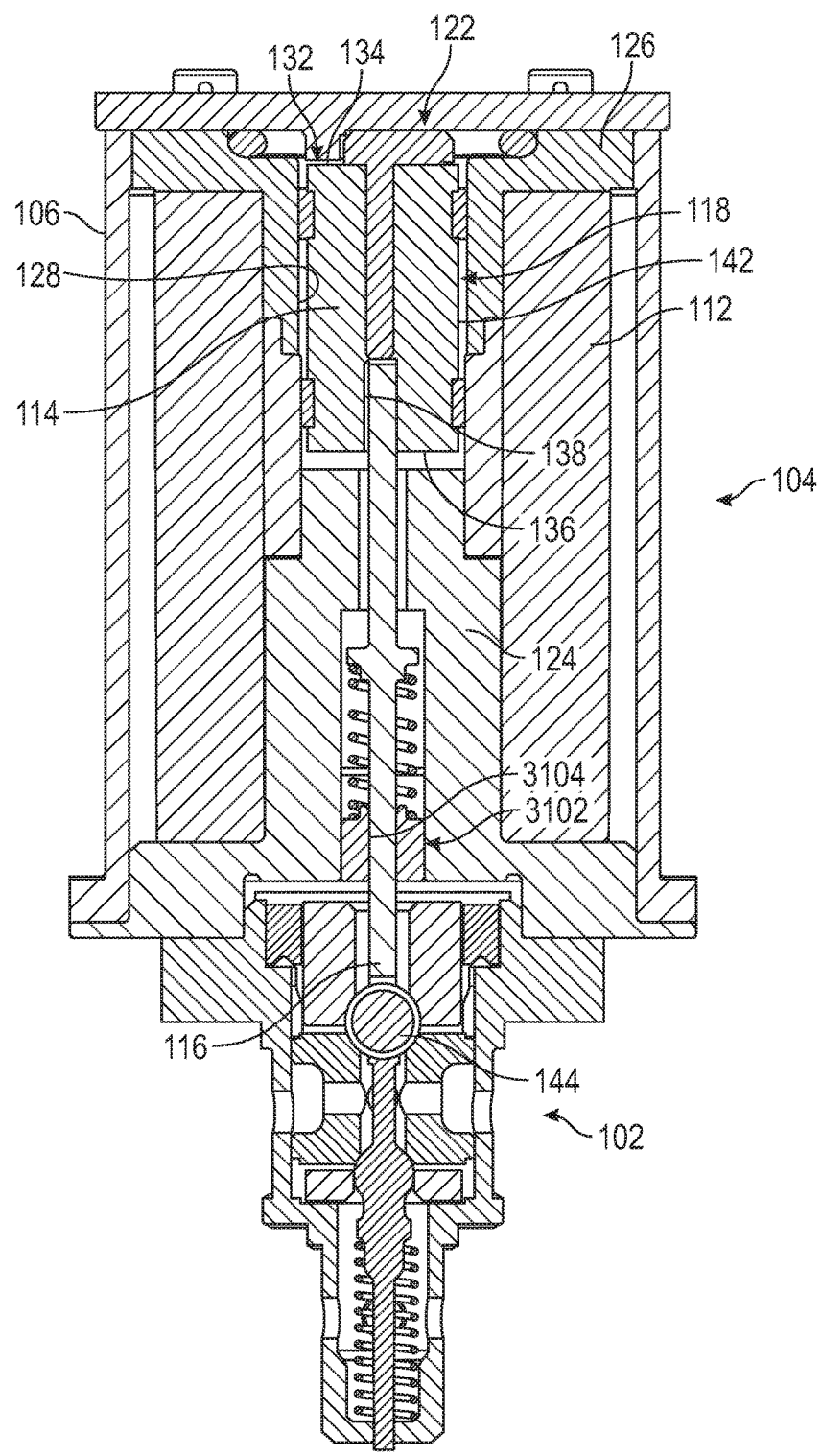
FIG. 31 depicts a cross section view of another embodiment of a high vibration, high-cycle, pulse width modulated (PWM) solenoid actuated valve assembly.

It should be noted that the solenoid actuator 104 depicted in FIGS. 1, 10, 15, and 20 are each configured as a pull-type solenoid. It will be appreciated that in other embodiments the solenoid actuator 104 could instead be configured as a push-type solenoid. For completeness, one example embodiment of a solenoid actuator 104 that is configured as a push-type solenoid is depicted in FIG. 31. It should be noted that components with like numbers to that of FIG. 1 represent the same components in both embodiments, although some may be disposed at different locations. Nonetheless, for brevity, these like numbered components need not, and thus will not, be further described.

The push-type solenoid configuration depicted in FIG. 31 does include an additional component that is not included in the other embodiments. This component is a rod guide 3102. The rod guide 1302 is disposed within the solenoid housing 106 and has an opening 1304 formed therein through which the actuation rod 116 extends. The rod guide 1302 may be comprised at least partially of a thermoplastic polymer material. Although various thermoplastic polymer materials are suitable, and may be used, in one particular embodiment, the thermoplastic polymer material is polyetheretherketone (PEEK). All or portions of the rod guide 1302 may be comprised entirely of the thermoplastic polymer material, or may be formed of other suitable materials, such as a suitable metal, that is coated (or at least partially coated) with the thermoplastic polymer material, with polytetrafluoroethylene (PTFE), or with fluorinated ethylene propylene (FEP).

Figure 32:
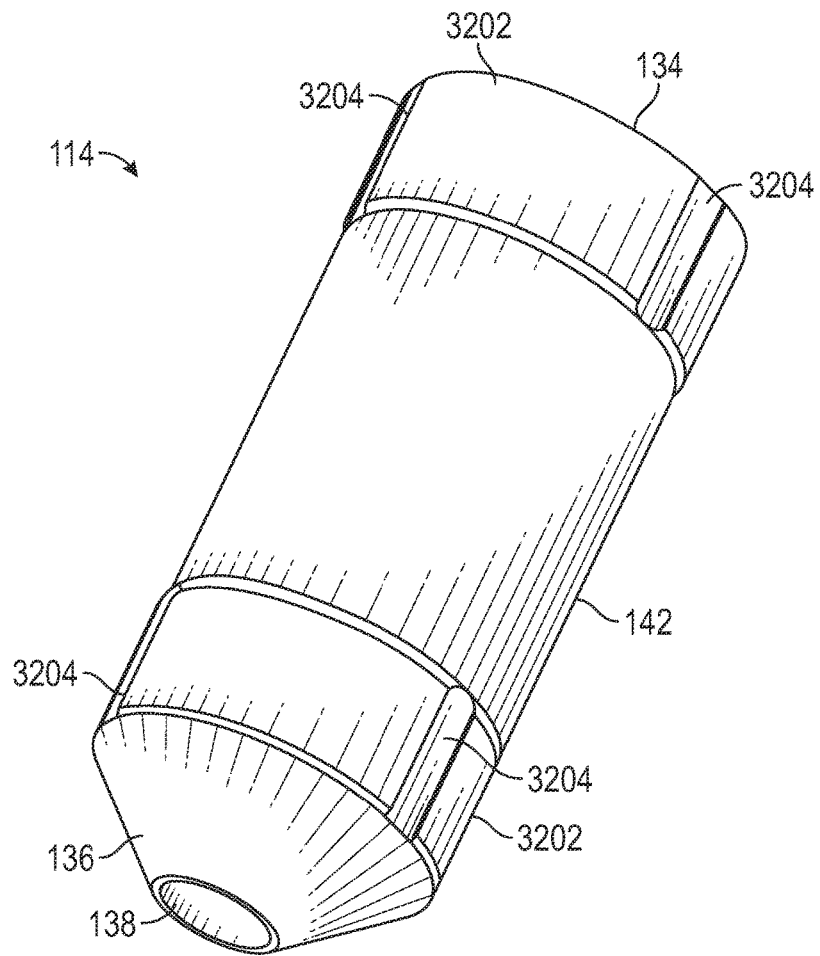
FIGS. 32-35 depict additional embodiments of an armature that may be implemented in a high vibration, high-cycle, PWM solenoid actuated valve assembly.
Figure 33:
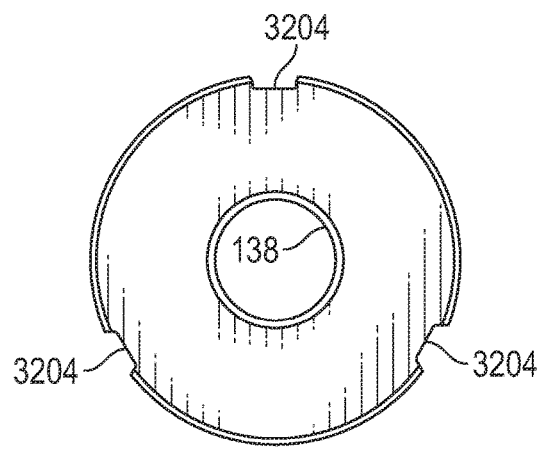

Referring now to FIGS. 32-35, two additional configurations of the armatures 114 are depicted and will now be described, beginning first with FIGS. 32 and 33. In this embodiment, the armature 114 is configured to be disposed (at least partially) within, and to be axially movable relative to, the yoke 126. The depicted armature 114 includes an armature first end 134, an armature second end 136, an armature inner surface 138, and an armature outer surface 142. The armature second end 136, in this embodiment, is conically shaped. Moreover, portions of the armature outer surface 142 may include fluted steps 3202 that contact the inner surface 128 of the yoke 126. The fluted steps 3202 are at least partially coated with suitable coating materials, and together implement the glide structure 118. Some non-limiting examples of suitable coating materials include electroless nickel plating with a lube coating, electroless nickel plating with tungsten disulfide coating, electroless nickel plating with PTFE, and various fluoropolymer coatings. In the depicted embodiment, each of the fluted steps 3202 also includes a plurality of axial slots 3204. The axial slots 3204, when included, are configured to prevent any air pockets or air locking from occurring.

Figure 34:
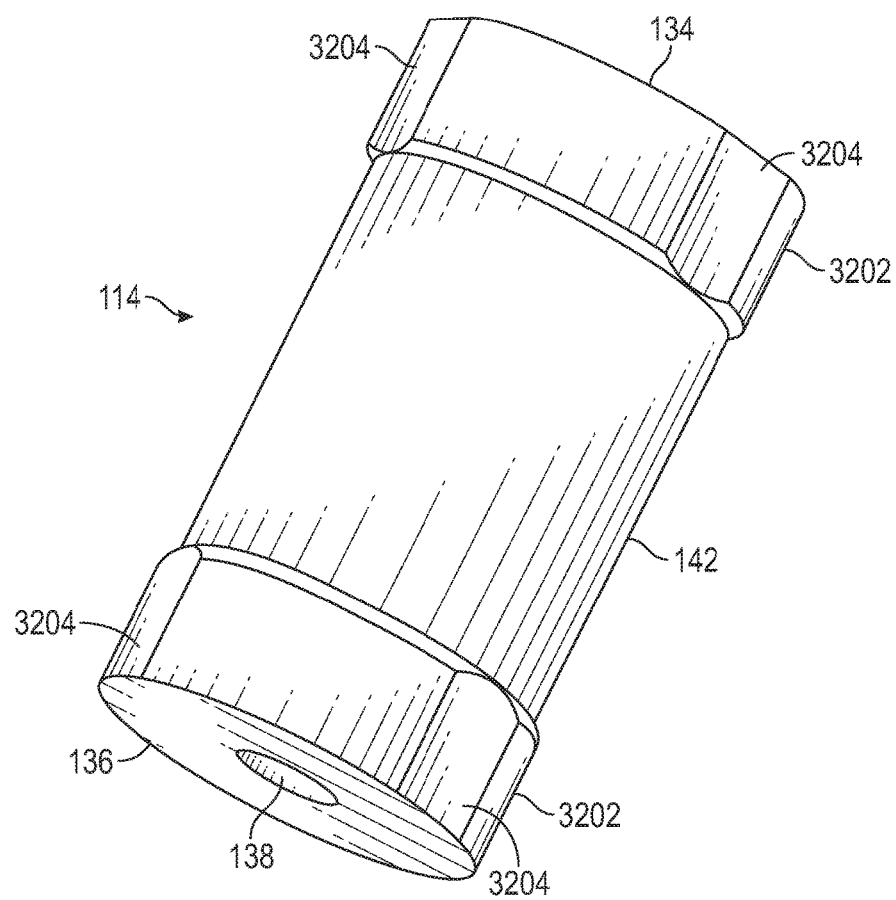
Figure 35:
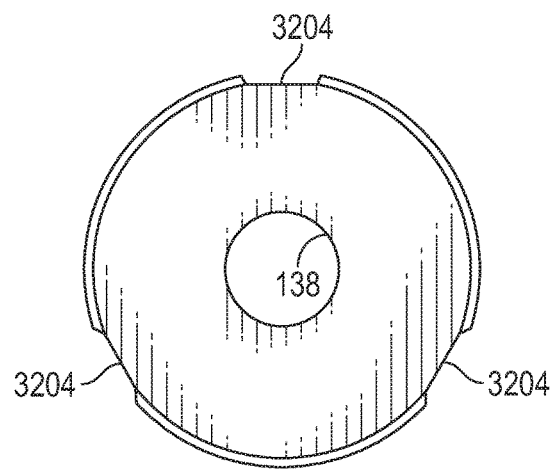

The armature 114 depicted in FIGS. 34 and 35 is also configured to be disposed (at least partially) within, and to be axially movable relative to, the yoke 126, and also includes an armature first end 134, an armature second end 136, an armature inner surface 138, and an armature outer surface 142. The armature second end 136 is not conically shaped in this embodiment. However, similar to the previously described embodiment, portions of the armature outer surface 142 may include fluted steps 3202 that contact the inner surface 128 of the yoke 126. The fluted steps 3202 are at least partially coated with suitable coating materials, and together implement the glide structure 118. Some non-limiting examples of suitable coating materials include electroless nickel plating with lube coating, electroless nickel plating with tungsten disulfide coating, electroless nickel plating with PTFE, and various fluoropolymer coatings. In the depicted embodiment, each of the fluted steps 3202 also includes a plurality of axial slots 3204. The axial slots 3204, when included, are configured to prevent any air pockets or air locking from occurring.

Figure 36:
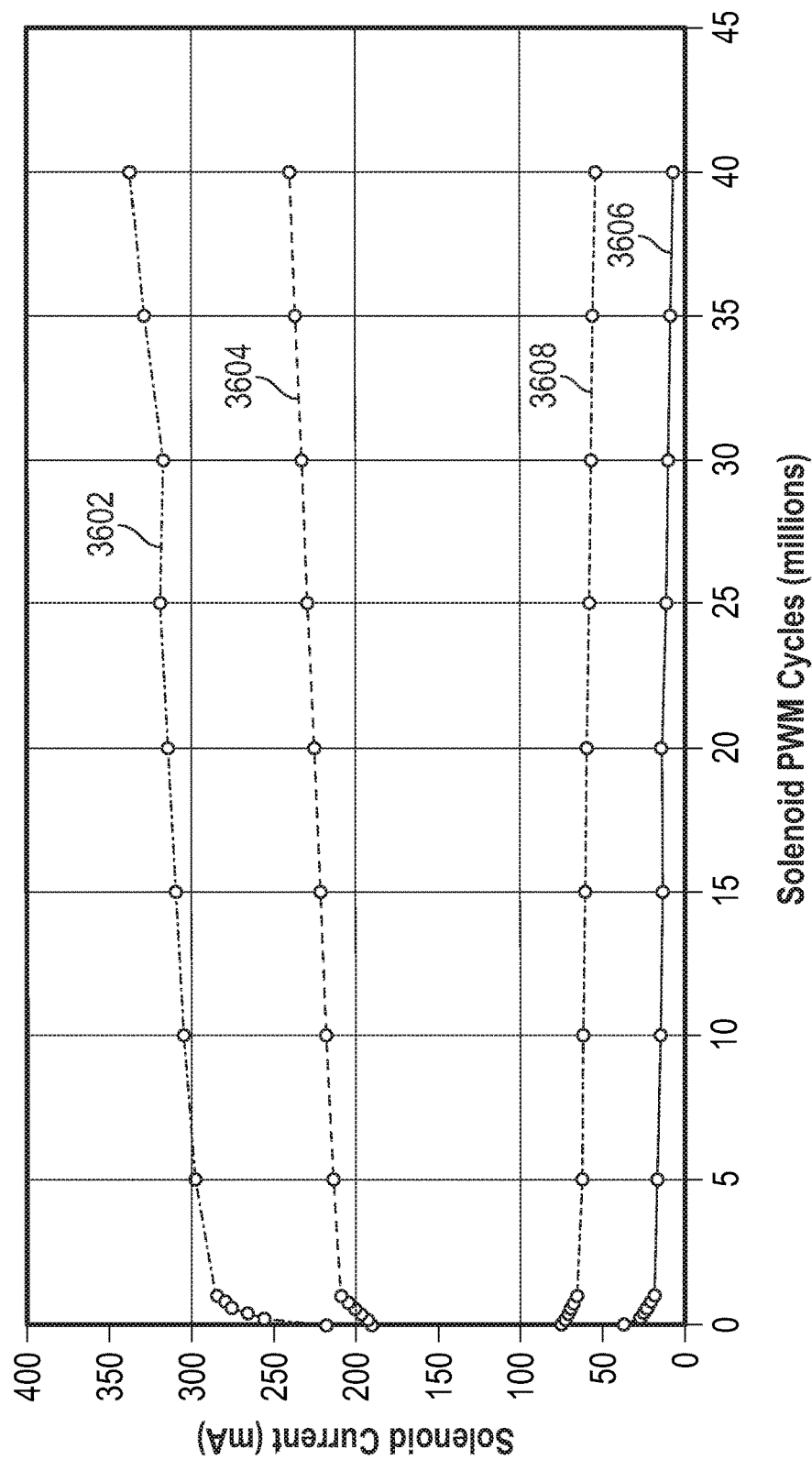
FIG. 36 graphically depicts comparisons of pull-in and drop-out currents for presently known solenoid actuators and for solenoid actuators according to embodiments depicted and described herein.

The high vibration, high cycle, PWM solenoid 100 described herein enables on/off valve modulation while maintaining suitable operational integrity throughout the needed number of operational cycles. For example, FIG. 36 graphically depicts comparisons of pull-in currents for presently known solenoid actuators 3602 and for solenoid actuators according to embodiments depicted and described herein 3604, and comparisons of drop-out currents for presently known solenoid actuators 3606 and solenoid actuators according to embodiments depicted and described herein 3608. These graphs clearly show that the solenoid actuators according to embodiments depicted and described herein provide significant improvements in both pull-in and drop-out currents.

Figure 37:
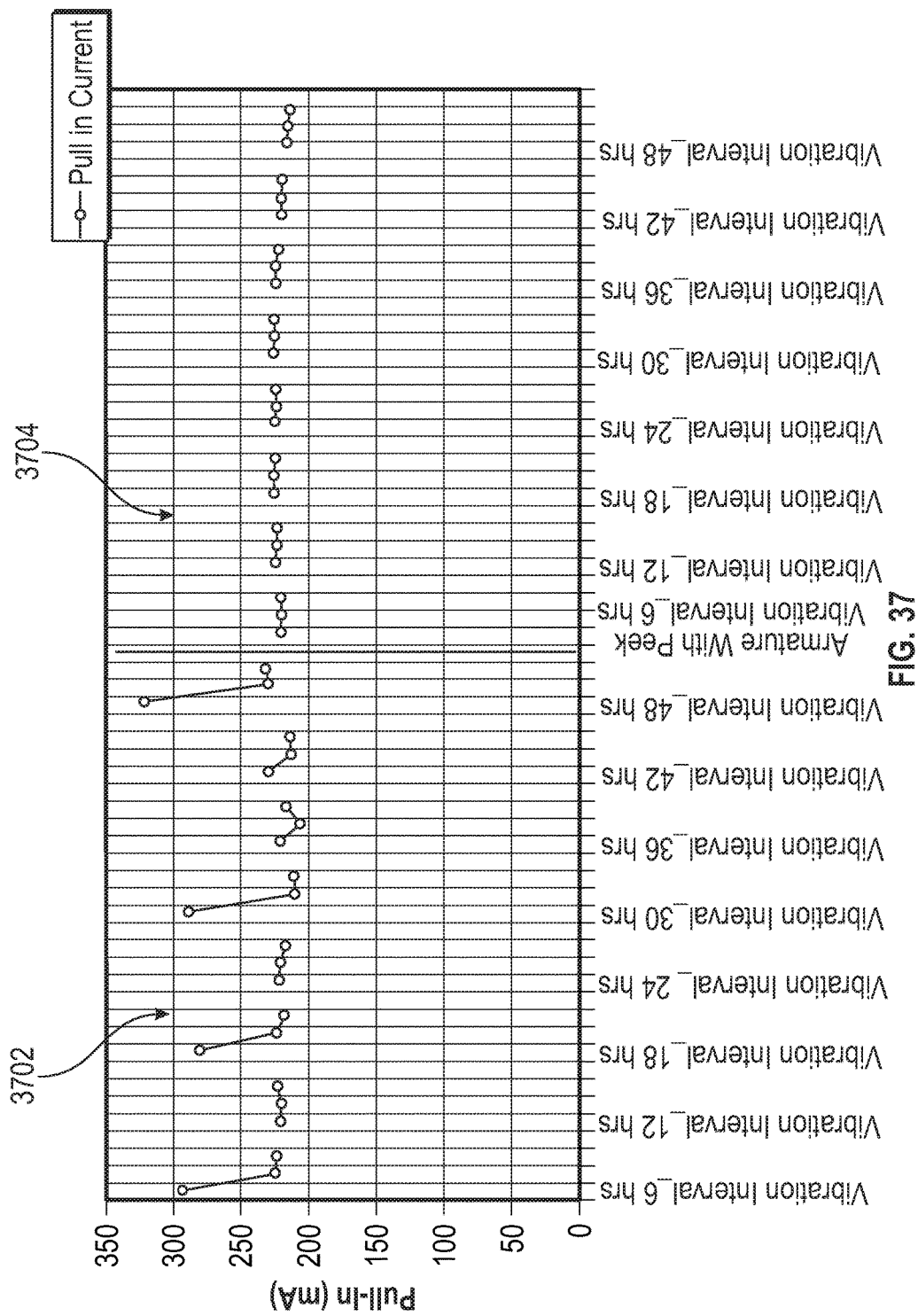
FIG. 37 graphically depicts comparisons of pull-in currents at preset intervals during vibration tests for presently known solenoid actuators and for solenoid actuators according to embodiments depicted and described herein.

Moreover, FIG. 37 graphically depicts comparisons of the pull-in currents at preset intervals during vibration tests for presently known solenoid actuators 3702 and for solenoid actuators according to embodiments depicted and described herein 3704. For the depicted tests, the pull-in current is measured three times during each interval before and after each vibration cycle is initiated. With the presently known solenoid actuators, the first pull-in current after each test interval is approx. 50% more than the pull-in current in subsequent tests. This indicates that when presently known solenoid actuators 3602 are energized from a constant current source with a current threshold, as in many modern aircraft, these actuators will not operate since they need to draw more current from the source.

Conversely, with solenoid actuators according to embodiments depicted and described herein, for both consecutive vibration intervals and as an overall pull-in current trend, it is clear that the pull-in current remains fairly constant, demonstrating its capability to operate in high vibration, current controlled environments, such as an aircraft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A high vibration, high-cycle, pulse width modulated (PWM) solenoid actuated valve assembly, comprising:
    a valve housing; and
    a solenoid actuator coupled to the valve housing, the solenoid actuator comprising:
        a solenoid housing coupled to the valve housing;
        a bobbin assembly disposed at least partially within the solenoid housing, the bobbin assembly including a return pole and a yoke, the yoke having an inner surface that defines an armature cavity;
        a coil disposed within the solenoid housing and wound around at least a portion of the bobbin assembly;
        an armature disposed within the armature cavity and axially movable relative to the yoke;
        a glide structure disposed at least partially within the armature cavity and between the armature and the inner surface of the yoke;
        an actuation rod coupled to, and axially movable with, the armature, the actuation rod extending into the valve housing and having a valve integrally formed thereon; and
        an anti-rotation guide structure disposed within the valve housing and surrounding at least a portion of the actuation rod,
        wherein at least the actuation rod and anti-rotation guide each have structural features formed thereon that mate with each other and thereby prevent rotation of the actuation rod and the armature.

2. The assembly of claim 1, wherein:
    the armature includes an armature inner surface and an armature outer surface, the armature inner surface defining a cavity into which the actuation rod extends, the armature outer surface having a plurality of spaced-apart grooves formed circumferentially therein; and
    the glide structure comprises a plurality of glide rings, each glide ring disposed at least partially in, and extending radially from, a different one of the plurality of spaced-apart grooves, one or more of the glide rings slidably engaging the inner surface of the yoke.

3. The assembly of claim 2, wherein each glide ring has a glide ring slit formed therein.

4. The assembly of claim 2, wherein:
    the armature includes an armature first end and an armature second end;
    the armature outer surface further has a plurality of spaced-apart axial slots, each axial slot extending between the armature first end and the armature second end; and
    a portion of each glide ring is disposed at least partially in a different one of the plurality of spaced-apart axial slots.

5. The assembly of claim 1, wherein the glide structure comprises:
    a cylindrical main body, the cylindrical main body including a main body inner surface, a main body outer surface, a main body first end, and a main body second end, the main body inner surface defining a passageway that extends between the main body first and second ends; and
    a flange extending radially from the main body second end and engaging the yoke,
    wherein:
        the armature extends into the passageway and slidably engages the main body inner surface, and
        the main body outer surface engages the inner surface of the yoke.

6. The assembly of claim 1, wherein:
    the armature includes an armature first end, an armature second end, an armature inner surface, and an armature outer surface, the armature inner surface defining a cavity into which the actuation rod extends, the armature outer surface having a plurality of spaced-apart glide pockets formed therein, each glide pocket disposed between the armature first end and the armature second end; and
    the glide structure comprises a plurality of glide strips, each glide strip disposed at least partially in, and extending radially from, a different one of the plurality of spaced-apart glide pockets and slidably engaging the inner surface of the yoke.

7. The assembly of claim 6, wherein:
    each glide pocket has a pair of relief grooves associated therewith, each pair of relief grooves including a first relief groove and a second relief groove, the first relief groove extending between the armature first end and a first end of the glide pocket, the second relief groove extending between the armature second end 136 and a second end of the glide pocket.

8. The assembly of claim 1, wherein:
    the armature includes an armature first end, an armature second end, an armature inner surface, and an armature outer surface, the armature inner surface defining a cavity into which the actuation rod extends, the armature outer surface having a plurality of spaced-apart axial slots, each axial slot extending between the armature first end and the armature second end; and the glide structure comprises a glide cap that engages the armature first end, the glide cap having a plurality of arms extending therefrom to an arm terminus, each arm terminus having a protrusion formed thereon that extends radially inwardly, each arm disposed at least partially in, and extending radially from, a different one of the plurality of spaced-apart axial slots and slidably engaging the inner surface of the yoke, each protrusion engaging the armature second end.

9. The assembly of claim 1, wherein:

the valve housing includes a housing inner surface that defines an actuation rod cavity, the housing inner surface having a stopper seat formed therein, the housing inner surface further including a flat outer stopper mating surface;

the actuation rod has a flat inner stopper mating surface formed thereon;

the anti-rotation guide structure comprises a stopper having a stopper first end, a stopper second end, a stopper inner surface, and a stopper outer surface;

the stopper first end engages the stopper seat;

the stopper inner surface defines an actuation rod opening and has a flat actuation rod mating surface formed thereon that mates with the flat inner stopper mating surface on the actuation rod; and the stopper outer surface has a flat valve housing mating surface formed thereon that mates with the flat outer stopper mating surface on the housing inner surface.

10. The assembly of claim 9, wherein:

the actuation rod further has a stopper engagement slot formed in the flat inner stopper mating surface;

the stopper inner surface has a slot engagement pin that extends inwardly from the flat actuation rod mating surface; and the slot engagement pin is disposed within the stopper engagement slot.

11. The assembly of claim 1, wherein:

the valve housing includes a housing inner surface that defines an actuation rod cavity, the housing inner surface having a stopper seat formed therein, the housing inner surface further including a flat outer stopper mating surface;

a portion of the actuation rod has an elliptical cross section;

the anti-rotation guide structure comprises a stopper having a stopper first end, a stopper second end, a stopper inner surface, and a stopper outer surface;

the stopper first end engages the stopper seat;

the stopper inner surface defines an actuation rod opening having an elliptical cross section that mates with the portion of the actuation rod that has an elliptical cross section; and the stopper outer surface has a flat valve housing mating surface formed thereon that mates with the flat outer stopper mating surface on the housing inner surface.

12. The assembly of claim 1, wherein:

the valve housing includes a housing inner surface that defines an actuation rod cavity, the housing inner surface having a stopper seat formed therein, the housing inner surface further including a flat outer stopper mating surface;

the actuation rod has a plurality of spaced-apart slot engagement pins formed thereon that extend radially outward;

the anti-rotation guide structure comprises a stopper having a stopper first end, a stopper second end, a stopper inner surface, and a stopper outer surface;

the stopper first end engages the stopper seat;

the stopper inner surface defines an actuation rod opening and has a plurality of spaced-apart actuation rod engagement slots formed therein, each actuation rod engagement slot having one of the slot engagement pins disposed therein; and the stopper outer surface has a flat valve housing mating surface formed thereon that mates with the flat outer stopper mating surface on the housing inner surface.

13. The assembly of claim 1, further comprising:

a valve seat structure disposed at least partially within the valve housing, the valve seat structure having an inner surface that defines a valve seat that is at least selectively engaged by the valve that is integrally formed on the actuation rod.

14. The assembly of claim 1, wherein:

at least a portion of the glide structure comprises a material selected from the group that includes a thermoplastic polymer material, polytetrafluoroethylene (PTFE), and fluorinated ethylene propylene (FEP); and at least a portion of the anti-rotation guide structure comprises a material selected from the group that includes a thermoplastic polymer material, polytetrafluoroethylene (PTFE), and fluorinated ethylene propylene (FEP).

15. The assembly of claim 1, wherein:

at least a portion of the glide structure comprises a metal coated with a material selected from the group that includes a thermoplastic polymer material, polytetrafluoroethylene (PTFE), and fluorinated ethylene propylene (FEP); and at least a portion of the anti-rotation guide structure comprises a material selected from the group that includes a thermoplastic polymer material, polytetrafluoroethylene (PTFE), and fluorinated ethylene propylene (FEP).

16. The assembly of claim 1, wherein the solenoid actuator is configured as a pull-type solenoid.

17. The assembly of claim 1, wherein the solenoid actuator is configured as a push-type solenoid.

18. The assembly of claim 17, further comprising:

a rod guide disposed within the solenoid housing, the rod guide having an opening formed therein through which the actuation rod extends, at least a portion of the rod guide comprising a material selected from the group that includes a thermoplastic polymer material, polytetrafluoroethylene (PTFE), and fluorinated ethylene propylene (FEP).

19. The assembly of claim 1, wherein:

the armature includes an armature inner surface and an armature outer surface, the armature inner surface defining a cavity into which the actuation rod extends; and the glide structure comprises a plurality of fluted steps formed on the armature outer surface, the fluted steps at least partially coated with a coating material, and each fluted step having a plurality of spaced-apart axial grooves formed therein.

20. The assembly of claim 19, wherein:
the armature further includes an armature first end and an armature second end, the armature second end having a conical or stepped conical shape.

* * * * *